US 8,587,225 B2
Nov. 19, 2013

(12) United States Patent
Ashar et al.

(10) Patent No.: US 8,587,225 B2
(45) Date of Patent: Nov. 19, 2013

(54) FLOOR PLAN DEDUCTION USING LIGHTING CONTROL AND SENSING

(75) Inventors: Premal Ashar, Mountain View, CA (US); Tanuj Mohan, Mountain View, CA (US); David Perkins, Mountian View, CA (US); Jonathan Golding, Los Altos Hills, CA (US)

(73) Assignee: enLighted, Inc., Sunnyvale, CA (US)

( * ) Notice: Subject to any disclaimer, the term of this patent is extended or adjusted under 35 U.S.C. 154(b) by 534 days.

(21) Appl. No.: 12/874,331

(22) Filed: Sep. 2, 2010

(65) Prior Publication Data

US 2011/0057581 A1 Mar. 10, 2011

Related U.S. Application Data

(63) Continuation-in-part of application No. 12/584,444, filed on Sep. 5, 2009, now Pat. No. 8,457,793.

(51) Int. Cl.
*H05B 37/00* (2006.01)

(52) U.S. Cl.
USPC .......................................... 315/312; 315/291

(58) Field of Classification Search
USPC ............. 315/185 R, 192, 291, 294, 299, 302, 315/307, 308, 312
See application file for complete search history.

(56) References Cited

U.S. PATENT DOCUMENTS

| | | | |
|---|---|---|---|
| 5,101,141 A | 3/1992 | Warner et al. | |
| 5,179,324 A | 1/1993 | Audbert | |
| 5,191,265 A | 3/1993 | D'Aleo et al. | |
| 5,283,516 A | 2/1994 | Lohoff | |
| 5,812,422 A | 9/1998 | Lyons | |
| 6,057,654 A | 5/2000 | Cousy et al. | |
| 6,188,181 B1 | 2/2001 | Sinha et al. | |
| 6,342,994 B1 | 1/2002 | Cousy et al. | |
| 6,548,967 B1 | 4/2003 | Dowling et al. | |
| 7,309,985 B2 | 12/2007 | Eggers et al. | |
| 7,348,736 B2 | 3/2008 | Piepgras et al. | |
| 7,382,271 B2 | 6/2008 | McFarland | |
| 7,437,596 B2 | 10/2008 | McFarland | |
| 7,550,931 B2 | 6/2009 | Lys et al. | |
| 7,566,137 B2 | 7/2009 | Veskovic | |
| 7,792,956 B2 | 9/2010 | Choong et al. | |
| 7,925,384 B2 | 4/2011 | Huizenga et al. | |
| 2004/0002792 A1 | 1/2004 | Hoffknecht | |
| 2005/0169643 A1 | 8/2005 | Franklin | |
| 2005/0231112 A1 | 10/2005 | Woo et al. | |
| 2006/0244387 A1* | 11/2006 | Park et al. .................. 315/169.1 |
| 2006/0275040 A1 | 12/2006 | Franklin | |
| 2007/0057807 A1 | 3/2007 | Walters et al. | |
| 2007/0061050 A1 | 3/2007 | Hoffknecht | |
| 2007/0086128 A1 | 4/2007 | Lane et al. | |
| 2007/0215794 A1 | 9/2007 | Cernasov et al. | |
| 2008/0185597 A1 | 8/2008 | Veskovic et al. | |
| 2008/0244104 A1 | 10/2008 | Clemente | |
| 2009/0026966 A1 | 1/2009 | Budde et al. | |
| 2009/0179596 A1 | 7/2009 | Willaert et al. | |

(Continued)

*Primary Examiner* — Douglas W Owens
*Assistant Examiner* — Jianzi Chen
(74) *Attorney, Agent, or Firm* — Brian R Short

(57) ABSTRACT

An apparatus and method of deducing building floor plan information are disclosed. One method includes changing an intensity of light generated from a plurality of lights within a building. A plurality of light sensors senses an intensity of light received from at least one of the plurality of lights. A distance between at least one light sensor and at least one of the plurality of lights is estimated based on the sensed intensity of light.

20 Claims, 8 Drawing Sheets

(56) References Cited

U.S. PATENT DOCUMENTS

| | | |
|---|---|---|
| 2009/0195161 A1 | 8/2009 | Lane et al. |
| 2010/0034386 A1 | 2/2010 | Choong et al. |
| 2010/0135186 A1 | 6/2010 | Choong et al. |
| 2010/0264846 A1 | 10/2010 | Chemal et al. |
| 2010/0270933 A1 | 10/2010 | Chemel et al. |
| 2010/0295482 A1 | 11/2010 | Chemal et al. |
| 2010/0301777 A1 | 12/2010 | Kraemer |
| 2011/0031897 A1 | 2/2011 | Henig et al. |

\* cited by examiner

Changing an intensity of light generated from a plurality of lights within a building
610

A plurality of light sensors sensing an intensity of light received from at least one of the plurality of lights
620

Estimating a distance between at least one light sensor and at least one of the plurality of lights based on the sensed intensity of light
630

FIGURE 6

FLOOR PLAN DEDUCTION USING LIGHTING CONTROL AND SENSING

Related Applications

This patent is a continuation-in-part (CIP) of U.S. patent application Ser. No. 12/584,444, filed Sep. 5, 2009, now granted as U.S. Pat. No. 8,457,793.

FIELD OF THE EMBODIMENTS

The described embodiments relate generally to lighting. More particularly, the described embodiments relate to deducing and/or supplementing building floor plan information through lighting control and light sensing.

BACKGROUND

Lighting control can be used to automatically control lighting under certain conditions, thereby conserving power. However, lighting control, specifically advanced lighting controls have not been widely adopted in the general commercial market because the installation, setup related costs and complexity have made these lighting systems prohibitively expensive for most commercial customers.

It is desirable to have a lighting method, system and apparatus for supplementing building floor plan information that are easy to install and are cost effective. It is desirable that the floor plan information be utilized for energy efficiency and cost reduction.

SUMMARY

One embodiment includes a method of deducing building floor plan information. The method includes changing an intensity of light generated from a plurality of lights within a building. A plurality of light sensors senses an intensity of light received from at least one of the plurality of lights. A distance between at least one light sensor and at least one of the plurality of lights is estimated based on the sensed intensity of light.

Another embodiment includes a system for deducing building floor plan information. The system includes a plurality of lights within a building. A central controller is operative to change an intensity of light emitted from at least a subset of the plurality of lights. A plurality of light sensors sensing an intensity of light received from at least one of the plurality of lights. The central controller is operative to retrieve values of the sensed intensity of light. A distance between at least one light sensor and at least one of the plurality of lights is estimated based on the sensed intensity of light.

Another embodiment includes an intelligent light fixture for aiding in deduction of building floor plan information. The light fixture includes a light, a light controller, a light sensor and a sensor monitor. The light controller is operative to change an intensity of light emitted from the light as commanded by a central controller. The light sensor is operative to detect light received from a neighboring light. The sensor monitor is operative to obtain a value from the light sensor indicating an intensity of detected light, and to provide the value of the intensity of the detected light to the central controller.

Other aspects and advantages of the described embodiments will become apparent from the following detailed description, taken in conjunction with the accompanying drawings, illustrating by way of example the principles of the described embodiments.

BRIEF DESCRIPTION OF THE DRAWINGS

FIG. 6 is a flow chart that includes an example of steps of a method of deducing building floor plan information.

DETAILED DESCRIPTION

The described embodiments are embodied in at least one apparatus and method for utilizing a lighting system for deducing building floor plan information of a building. The deduced floor plan information can then be used to improve lighting control of the building.

Figure 1:
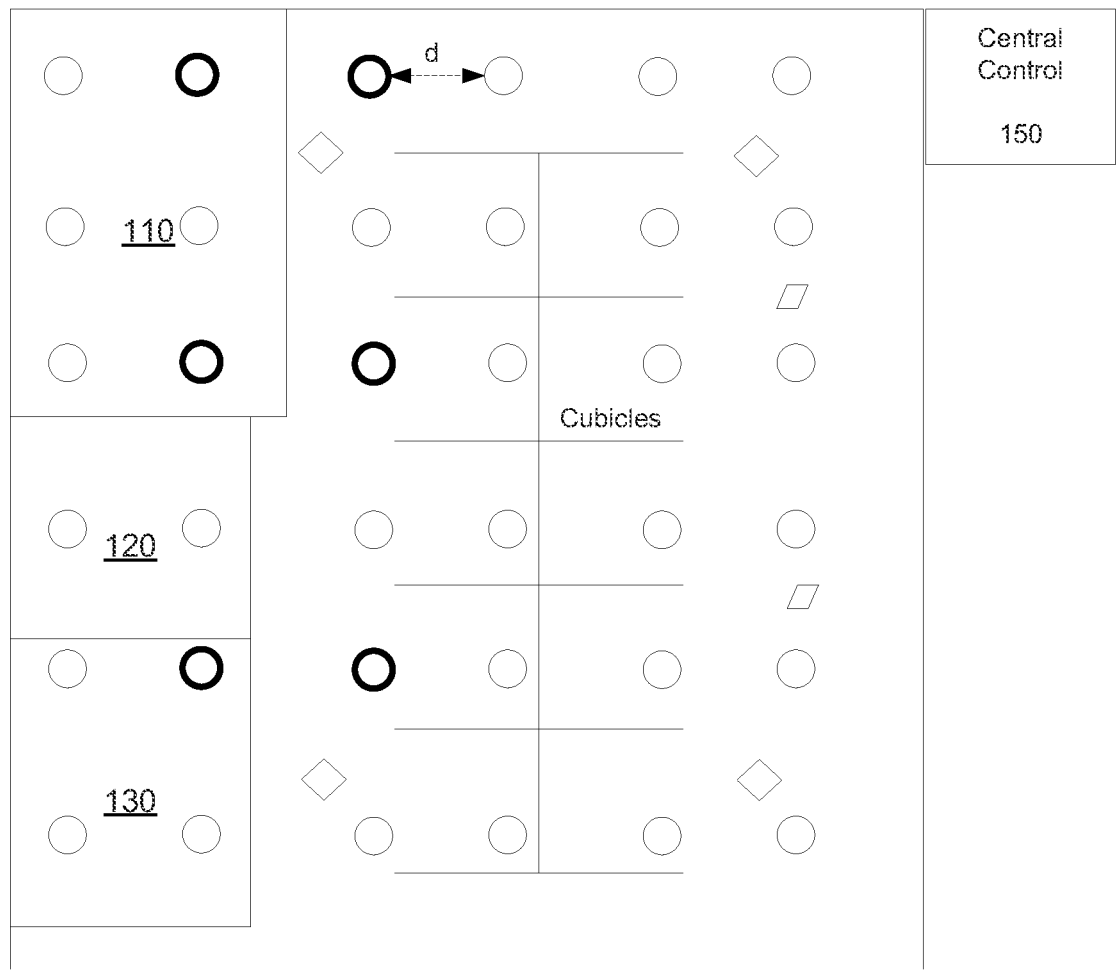
FIG. 1 shows an example of at least a portion of a building floor plan, and an example of a lighting system that can be used for deducing building floor plan information.

FIG. 1 shows an example of at least a portion of a building floor plan, and an example of a lighting system that can be used for deducing building floor plan information. As shown, lights, light sensors and motion sensors are distributed at various locations with the building as shown by the building floor plan. It is to be understood that the lights, light sensors and motion sensors of FIG. 1 can each be a stand-alone individual unit, or any combination of the three can be included within a single unit. Various types of room types are shown, which can each have a different set of conditions that influence how best to control the lighting of the room type.

The lighting system can be used to generate a building floor plan, or to supplement an existing building floor plan. The light intensity of any of the lights can be changed. Proximate light sensors detect the change in light intensity. By sensing the intensity of the received light, distances between the lights and the sensors can be estimated.

FIG. 1 includes a central controller 150. Embodiments include the controller 150 controlling when the light intensity of each light is changed. Generally, the exact location of each light and light sensor is not known. Embodiments include the controller 150 changing the intensity of light of each of the lights according to a sequence. That is, for example, the sequence can include pulsing (adjusting the intensity of the light) each light of the system in succession. That is, one light is activated at a time, until all of the lights have been activated. Following such a sequence can be advantageous because neighboring lights are unlikely to interfere with each other. However, due to the possibility of there being a large number of lights, another sequence can include pulsing multiple lights, wherein each of the multiple lights are physically separate enough in distance that the light do not appreciably interfere with each other.

The controller 150 can be interfaced with the lights and the light sensors. Therefore, the distance measurements between the lights and the light sensors can be calculated or estimated by the controller 150.

Additionally, the controller can be interfaced with the motion sensors. Based on information received from the motion sensors, the controller 150 can deduce additional floor plan information, such as, locations of high traffic areas and adjacencies between areas.

Figure 2A:
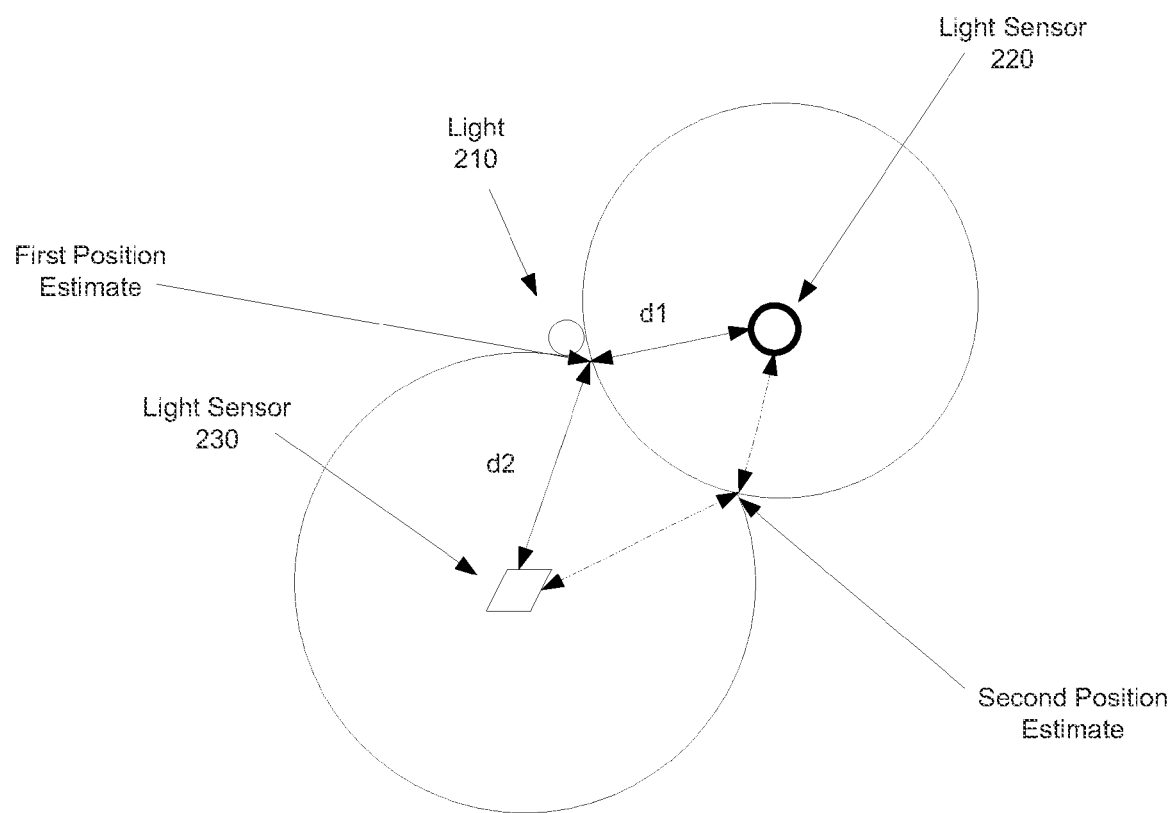
FIG. 2 shows an example of lights and light sensor that are proximate, and can be used for estimating distances between the lights and the light sensors.
Figure 2B:
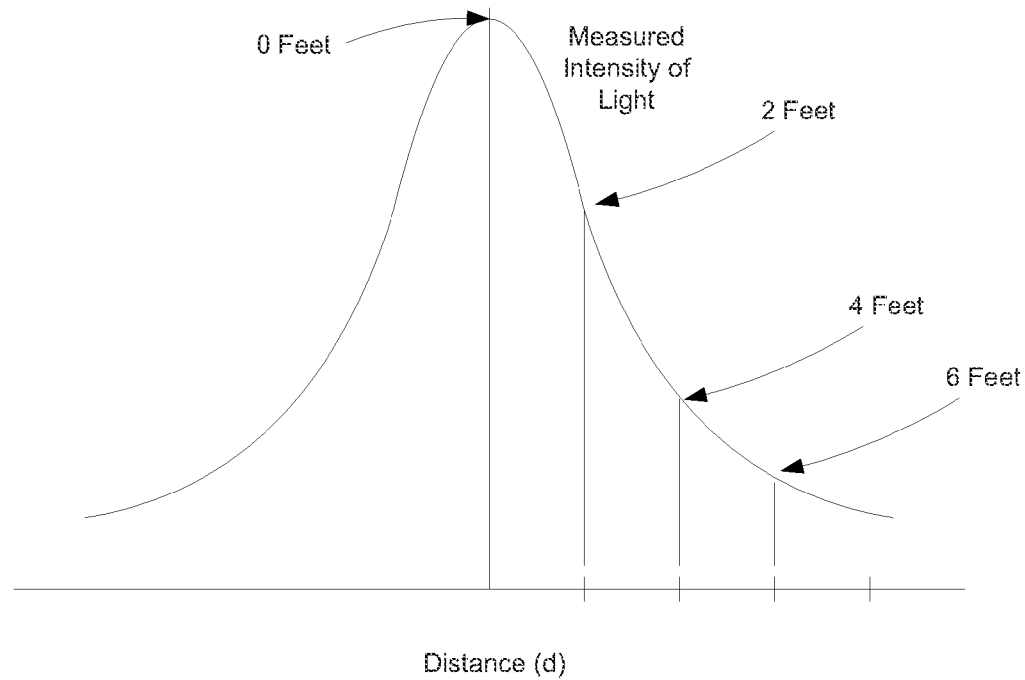

FIG. 2A shows an example of lights and light sensor that are proximate, and can be used for estimating distances between the lights and the light sensors. FIG. 2B depicts an exemplary relationship between a sensed light intensity, and an estimated distance between a light and a light sensor based on the sensed light intensity.

As shown in FIG. 2A, two exemplary light sensors 220, 230 receive light from the light 210. Based on the received light intensity, the sensors 220, 230 can estimate a distance between each of them and the light. Generally, the sensors 220, 230 are Omni-directional, and cannot sense the direction of the light—only the distance from the light source. Therefore, the distances as determined by more than one light sensor can be used to estimate the location of the light 210. That is, for example, the distances d1, d2 of the two light sensors can be used to estimate the location of the light relative to the light sensors at the first position estimate and the second position estimate. With a third light sensor, triangulation can be used to accurately determine a single position of the light 210. However, with only two light sensors, additional information can be used to deduce the position of the light 210 relative to the sensors 220, 230. For example, knowledge of the locations of walls within the building, or knowledge of patterns of the lights can be additionally used to deduce which of the first position estimate and the second position estimate is the actual position of the light 210.

As shown in FIG. 2B, the intensity of light generated by the light 210 diminishes with distance traveled by the light way from the light 210. The light intensity at exemplary distances of 0 feet, 2 feet, 4 feet and 6 feet are depicted in FIG. 2B. Based on knowledge of the relationship between received light intensity and distance as shown by the exemplary curve of FIG. 2B, the distances between the light sensor and the originating light can be estimated based on the sensed light intensity.

Figure 3:
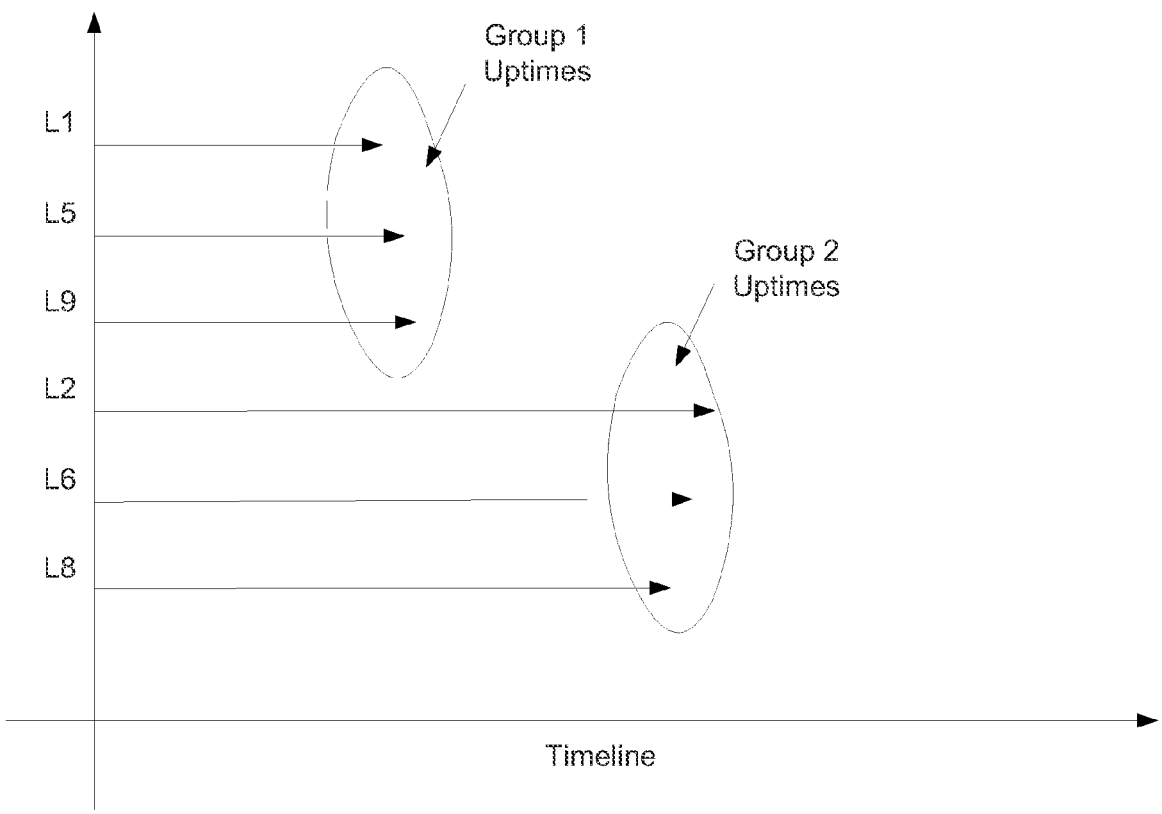
FIG. 3 is a time-line that shows examples of uptimes of several lights, and grouping of lights according to similar uptimes.

FIG. 3 is a time-line that shows examples of uptimes of several lights, and grouping of lights according to similar uptimes. For the purpose of description, the uptime is defined as the time duration between when a light is "powered up" and a later sampled time. The uptime can be useful for identifying groups of light. For an embodiment, the groups of lights having common uptimes are identified as being on the same floor of a multi-floor building. As shown by example in FIG. 3, lights having uptimes within a predetermined margin of each other are grouped.

Grouping of the lights using uptime is useful when the lights and sensors are connected via a network instead of via direct physical connection. This is because when a network is used, the physical location cannot be easily determined. However, due to the practice followed in providing electrical circuits for lights in a building, which is to put only lights on the same floor on the same circuit, power cycling an electrical circuit results in all fixtures having approximately the same value for uptime. Correlating this uptime with the power cycling of a circuit and knowing the physical location of the circuit or one of the fixtures on the circuit determines the location of the other fixtures with the approximately same uptime.

Figure 4:
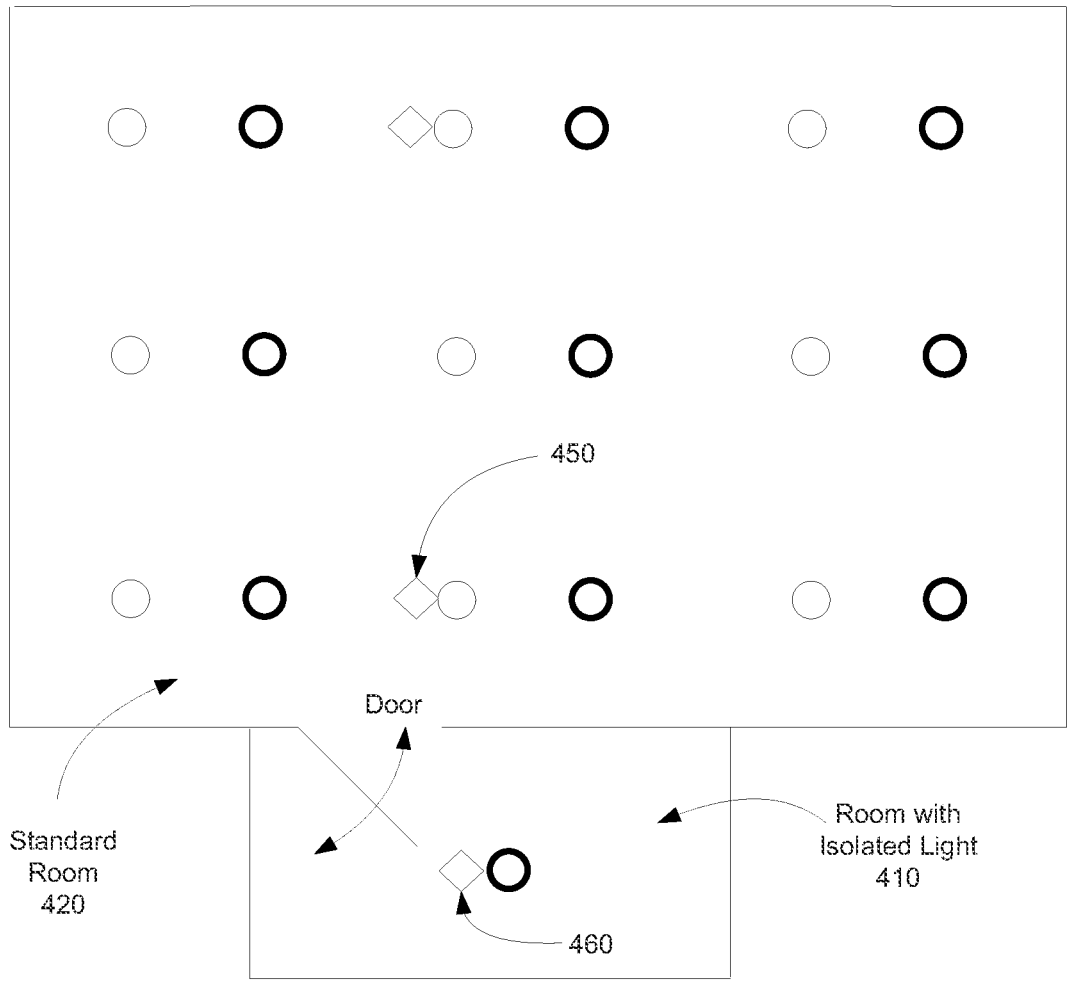
FIG. 4 is another example of at least a portion of a floor plan which includes an example of an isolated light.

FIG. 4 is another example of at least a portion of a floor plan which includes an example of an isolated light. Isolated lights provide additional difficulties in floor plan characterization because there may not be a light sensor that can sense light from the adjacent or neighboring light. In situations in which a light has been identified as isolated, motion sensing can aid in deduction of the floor plan. For example, once a light or light sensor has been identified as isolated, an embodiment includes sensing motion proximate to the at least one physically isolated light by, for example, sensor 460. Further, the sensed motion is correlated with other sensed motion of a near-neighboring sensor (such as motion sensor 450) that also detects motion within a margin of time of the proximate sensed motion. Additional floor plan information can be determined based on the knowledge of the sensed motion.

The proximate sensed motion indicates a passage way, such as a door, between two areas. The location of the passage way provides relative placement of the two areas in the floor plan.

Figure 5:
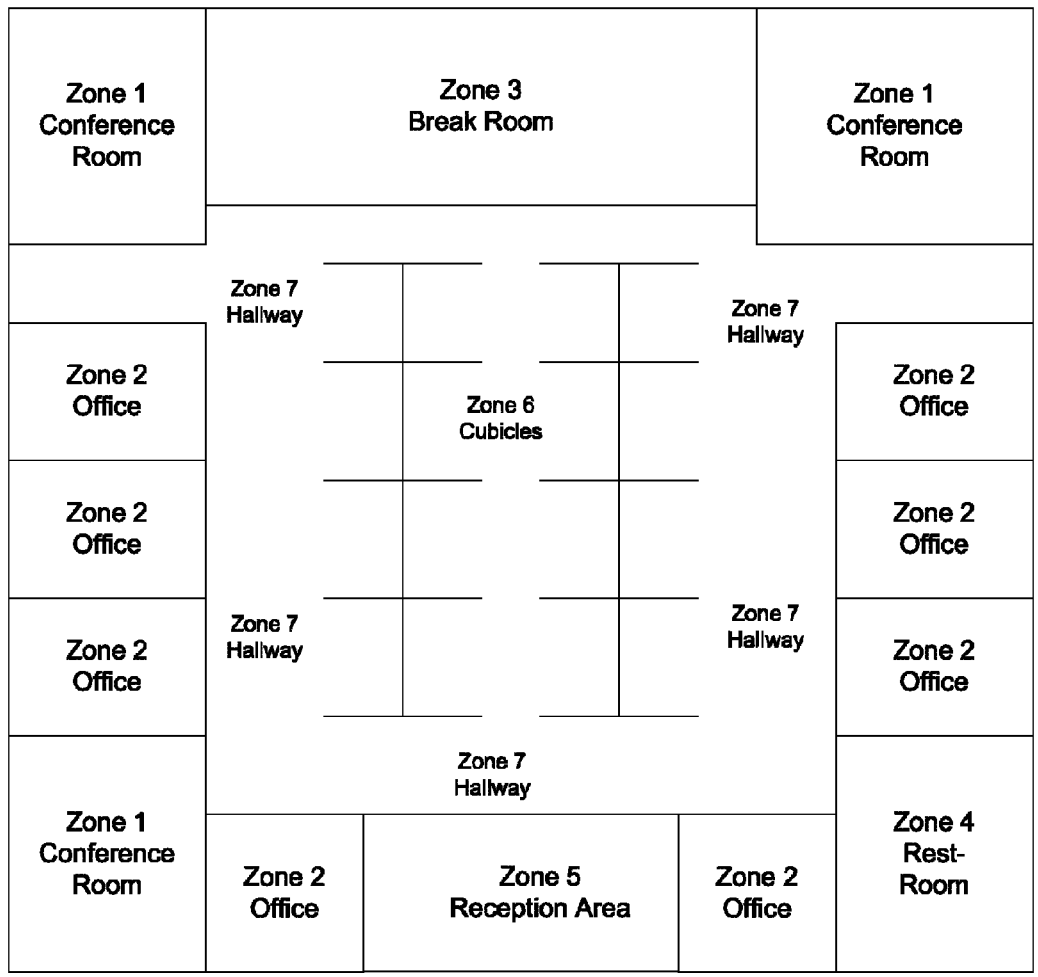
FIG. 5 is another example of at least a portion of a floor plan that includes the designation of zones within the floor plan.

FIG. 5 is another example of at least a portion of a floor plan that includes the designation of zones within the floor plan. This exemplary floor plan includes zones 1, 2, 3, 4, 5, 6, 7. The zones can be estimated based upon the floor plan information determined through the use of the lights, light sensors and motion sensors. Once determined, the zones can be used to achieve a useful desired purpose. For example, light of each of the identified zones can be controlled according to the classifications, providing improvements in at least one of energy consumption, occupancy comfort and security.

Zones are areas which have similar usage such as open-floors, conference rooms, private offices, restrooms, and/or break rooms. Based on the information gleaned from the occupancy pattern and the light sensors it is possible to determine the zone. For example, a conference room typically has meetings starting at the hour over the course of the day, an occupancy (for example, motion) sensor senses increased motion at the hour boundaries with lulls in between. Furthermore, a light sensor is capable of determining the number of fixtures present in the zone allowing the system to infer the size of the room thus confirming the zone identification. Once identified, the lighting can be controlled appropriately. Another example is a restroom, which typically go very dark when the lights turn off (as restrooms in the United States do not have windows), and the occupancy pattern throughout the day can confirm the identification. Embodiments include identifying zones within a building, and then appropriately controlling lights within the zones to reduce the energy dissipated while still providing a user-friendly light environment.

A zone identified as, for example, a reception area may have lighting continuously on, even when no one is present, to enhance the security of the building. Also consider a break room. When identified as such, the lighting can be lowered to an appropriate level for eating and informal conversation, which is lower than needed for reading in an office environment. This enhances the comfort for the occupants to have the light level for the tasks primarily performed in the room. Now consider restrooms, which are typically configured to turn all lights off shortly after determining that no occupants are present. This is different from lights in open offices and conference rooms during nonworking hours, which turn lights on nearby occupants and dim all other lights in the room thus providing security while reducing energy usage.

FIG. 6 is a flow chart that includes an example of steps of a method of deducing building floor plan information. A first step 610 includes changing an intensity of light generated from a plurality of lights within a building. A second step 620 includes a plurality of light sensors sensing an intensity of light received from at least one of the plurality of lights. A third step 630 includes estimating a distance between at least one light sensor and at least one of the plurality of lights based on the sensed intensity of light. Information of the building floor plan can be supplemented based on known locations of at least one light sensor and at least one light, and based on estimated distances.

An embodiment includes monitoring an up-time of a plurality of lights. Generally, the up-time can be defined as the length of time from reset due to, for example, power cycling a device (light). Once the up-times of the plurality of lights have been determined, the up-times can be grouped based on similar up-times. The groups of lights having similar up-times can be assumed, for example, to be on the same (common) floor of the building. Similarly, an up-time of a plurality of light sensors can be monitored. At least a subset of the plurality of light sensors can be grouped based on similar up-times. The groups of light sensors having similar up-times can be assumed, for example, to be on the same (common) floor of the building.

Another embodiment includes identifying physically isolated lights or light sensors. Neighborhoods can be determined by determining neighbors of neighbors. A light sensor in a room may not be able to sense light generated from all of the lights in the room. Thus, to determine all of the lights in a room, each light sensor determines the nearby lights (which are nearby neighbors). If two sensors can sense the same light, then they are neighbors. Thus, the neighborhood is determined by the union of these two sensors and lights sensed by either sensor. The process of defining a neighborhood adds sensors and lights until no additional ones can be added. Note that it doesn't matter which sensor is used to start the process.

Figure 7:
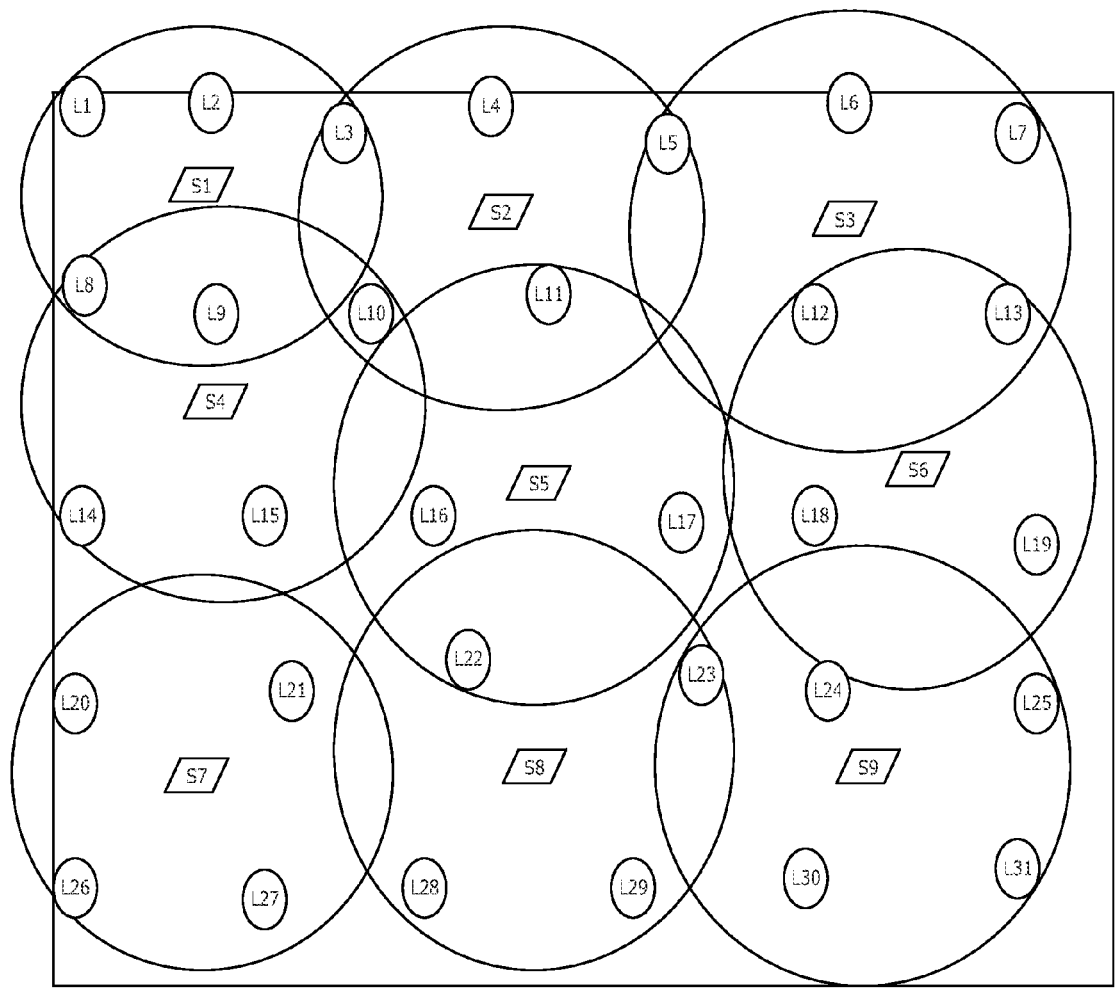
FIG. 7 shows an example of a room that includes many neighboring lights and neighboring light sensors in which light and light sensor neighborhoods can be determined.

FIG. 7 shows an example of a room 710 that includes many neighboring lights (L1-L31) and neighboring light sensors (S1-S9) in which light and light sensor neighborhoods can be determined. The process for determining lights within the neighborhood can begin, for example, with the upper left most corner of the room, and proceeds to add sensors and lights moving away from original sensor (for example, S1). That is, each sensor (Sn) determines the lights (Ln) that it can sense. For each sensor, the lights sensed by the sensor are within the circle indicated around the sensor. Starting from an arbitrary sensor, say, S1, this is lights L1, L2, L3, L8, and L9. Each of the lights is checked to see if they are sensed by another sensor. The result is L3 by S2, and L8 and L9 by S4. The lights and sensors are combined to expand the neighborhood, and results in the addition of lights L4, L5, L10, L11, L14, and L15, and sensors S2 and S4. These steps are repeated for each added sensor until no more sensors can be added. For example, sensor S2 senses light L5 also sensed by sensor S3, and L11 also sensed by sensor S5. Thus, these sensors and the lights sensed by them (which are L6, L7, L12, L13, L16, L17, and L22) are added to the neighborhood.

Once a light or light sensor has been identified as isolated, and embodiment includes sensing motion proximate to the at least one physically isolated light or sensor. Further, the sensed motion is correlated with other sensed motion of a near-neighboring sensor that also detects motion within a margin of time of the proximate sensed motion. Additional floor plan information can be determined based on the knowledge of at least one of the sensed motion.

An embodiment further includes motion sensing, wherein the motion sensing aids in deducing the building floor plan. The motion sensing can include sensing natural motion or sensing orchestrated motion. Generally, natural motion includes motion of occupants within a building who are acting without direction. Generally, orchestrated motion includes motion of occupants within the building who are acting with direction.

Embodiments include estimating a use of the floor plan based on the knowledge of the sensed motion. For example, areas that are frequently used may be identified from areas of infrequent use.

Consider a storage room for janitorial supplies. It should only show usage during the hours that the janitors are working. A break room should sense much motion and occupants at lunch time, possibility breakfast and dinner times, and infrequent use during other times. Conference rooms should sense much motion and before a meeting started and after a meeting has finished, and is typically correlated to the hour. A reception area and accesses to the outside show motion at the beginning of the work day, possibly at lunch time, and at the end of the work day. Otherwise, there is typically infrequent motion in these areas.

An embodiment include identifying zones of the building floor plan based on sensed light, sensed motion and/or the estimated distances, wherein zones include logical groupings. Zone information can be used to determine additional floor plan information. For example, sizing information can be determined based on knowledge of a number of contiguous lights within the identified zone. Occupancy pattern information within the identified zones can be sensed.

An embodiment includes sensing natural light within the identified zone. The sensed natural light can be used to determine directions and orientation of a floor plan on a map.

An embodiment includes controlling lighting of each of the identified zones according to the classifications, providing improvements in at least one of energy consumption, occupancy comfort and security.

A more specific embodiment of a light sensor includes an image sensor. Embodiments of the image sensors can sense light intensity and light direction from at least one of the plurality of lights. Clearly, additional floor plan layout information can be deduced from the sensed light intensity and direction.

An embodiment includes a light sensor or a light within a mobile device being used to aid the determination of floor plan information. The mobile device can include, for example, a flashlight, a smart mobile phone (such as an iPhone), which possibly includes GPS capability, a light meter, or even a box on a stick (to blanket a sensor so that no light can reach it). The mobile device can be used to communicate information from the mobile device to a light sensor using a pattern of changes in light intensity (flashlight, cell phone, or box on a stick). This is to specify the location of the sensor, give a command to a sensor, and associate two or more sensors. Additionally, the mobile device can receive communications from a light using a pattern of changes in light intensity (a mobile phone with an image and/or light sensor). This allows a light to be identified (and location recorded), give commands (such as direct motion), and provide results from an operation.

Other embodiments include occupancy detection, wherein the occupancy detection aids in deducing the building floor plan. Additionally, temperature detection can be utilized, wherein the temperature detection aids in deducing the building floor plan.

Figure 8:
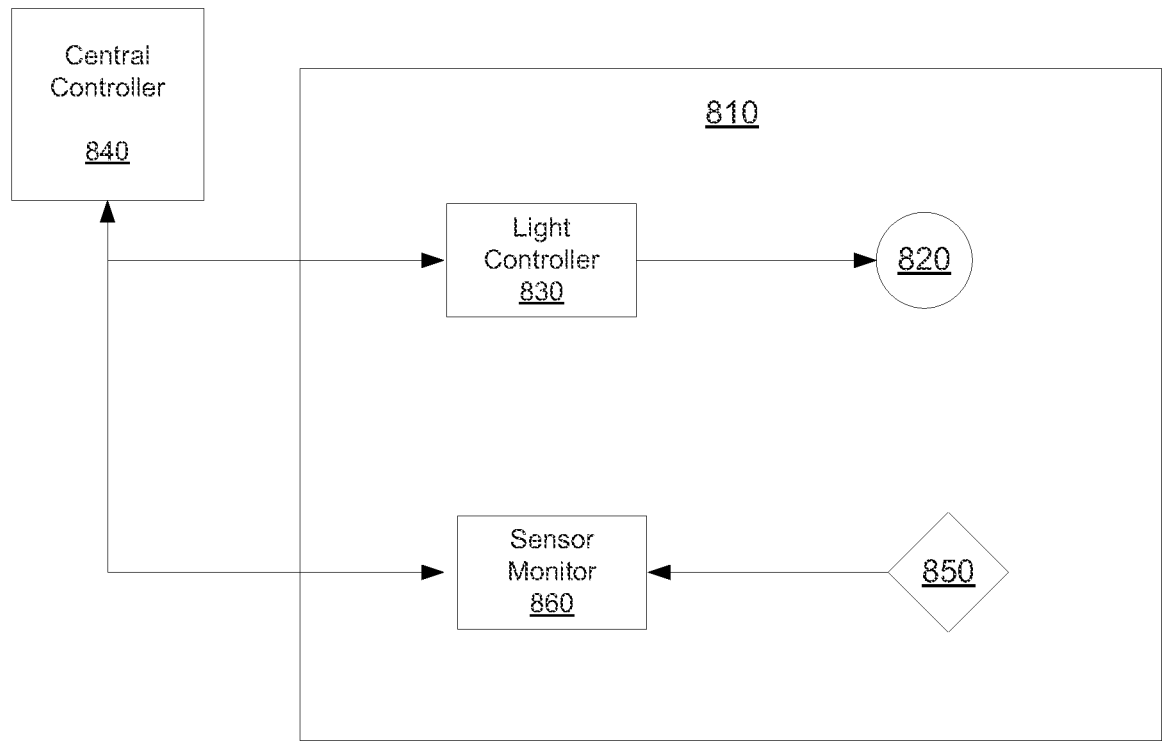
FIG. 8 shows an example of an intelligent light fixture for aiding in deduction of building floor plan information.

FIG. 8 shows an example of an intelligent light fixture for aiding in deduction of building floor plan information. The intelligent light fixture 810 includes a light 820, a light controller 830 operative to change an intensity of light emitted from the light as commanded by a central controller 840, a light sensor 850 operative to detect light received from a neighboring light, and a sensor monitor 860 operative to obtain a value from the light sensor indicating an intensity of detected light, and to provide the value of the intensity of the detected light to the central controller 840.

Although specific embodiments have been described and illustrated, the described embodiments are not to be limited to the specific forms or arrangements of parts so described and illustrated. The embodiments are limited only by the appended claims.

What is claimed:

1. A method of deducing building floor plan information comprising:
   changing an intensity of light generated from a plurality of lights within a building;
   a plurality of light sensors sensing an intensity of light received from at least one of the plurality of lights;
   wherein a mobile device includes at least one of the at least one light sensor or the at least one of the plurality of lights; and wherein
   the mobile device communicates with at least one of the at least one light sensor or the at least one of the plurality of lights through changes in patterns of light intensity, wherein the communication allows at least one of the at least one light sensor or the at least one of the plurality of lights to be identified, and location recorded.

2. The method of claim 1, wherein the at least one sensor comprises a light sensor within the mobile device.

3. The method of claim 2, wherein the mobile device communicates with the one of the plurality of lights through the light sensor.

4. The method of claim 3, wherein the communication includes a location of the light sensor.

5. The method of claim 3, wherein the communication allows the one of the plurality of lights to be identified, and location recorded.

6. The method of claim 1, wherein the at least one of the plurality of lights comprises a light within a mobile device.

7. The method of claim 6, wherein the mobile device communicates with the at least one sensor through the light.

8. The method of claim 6, wherein the communication allows commands to be given to the at least one sensor.

9. The method of claim 6, wherein the communication includes specification of a location of the at least one sensor.

10. A method of deducing building floor plan information comprising:
    changing an intensity of light generated from a plurality of lights within a building;
    a plurality of light sensors sensing an intensity of light received from at least one of the plurality of lights;
    estimating a distance between at least one light sensor and at least one of the plurality of lights based on the sensed intensity of light;
    monitoring an up-time of a plurality of lights, and grouping at least a subset of the plurality of lights based on similar up-times, wherein groups of lights are identified as being on a common floor of the building.

11. A system for deducing building floor plan information comprising:
    a plurality of lights within a building;
    a central controller operative to change an intensity of light emitted from at least a subset of the plurality of lights;
    a plurality of light sensors sensing an intensity of light received from at least one of the plurality of lights;
    a mobile device operative to communicate with at least one of the at least one light sensor or the at least one of the plurality of lights through patterns of changes in light intensity, wherein the communication allows at least one of the at least one light sensor or the at least one of the plurality of lights to be identified, and location recorded.

12. The system of claim 11, further comprising the central controller operative to monitor an up-time of a plurality of lights, and group at least a subset of the plurality of lights based on similar up-times, wherein groups of lights are identified as being on a common floor of the building.

13. The system of claim 11, wherein the at least one sensor comprises a light sensor within the mobile device.

14. The system of claim 13, wherein the mobile device communicates with the one of the plurality of lights through the light sensor.

15. The system of claim 14, wherein the communication includes a location of the light sensor.

16. The system of claim 14, wherein the communication allows the one of the plurality of lights to be identified, and location recorded.

17. The system of claim 11, wherein the at least one of the plurality of lights comprises a light within a mobile device.

18. The system of claim 17, wherein the mobile device communicates with the at least one sensor through the light.

19. The system of claim 17, wherein the communication allows commands to be given to the at least one sensor.

20. The system of claim 17, wherein the communication includes specification of a location of the at least one sensor.

* * * * *